(12) United States Patent
Carlson et al.

(10) Patent No.: US 10,382,514 B2
(45) Date of Patent: Aug. 13, 2019

(54) PRESENTATION OF MEDIA IN AN APPLICATION

(75) Inventors: Eric Carlson, Berkeley, CA (US); Kevin Calhoun, Sonoma, CA (US); David W. Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1654 days.

(21) Appl. No.: 12/018,175

(22) Filed: Jan. 22, 2008

(65) Prior Publication Data

US 2008/0235566 A1 Sep. 25, 2008

Related U.S. Application Data

(60) Provisional application No. 60/919,164, filed on Mar. 20, 2007.

(51) Int. Cl.
| | |
|---|---|
| *G06F 16/70* | (2019.01) |
| *H04L 29/06* | (2006.01) |
| *H04N 21/84* | (2011.01) |
| *G06F 16/957* | (2019.01) |
| *G06F 16/958* | (2019.01) |
| *H04N 21/235* | (2011.01) |
| *H04N 21/431* | (2011.01) |
| *H04N 21/435* | (2011.01) |
| *H04N 21/443* | (2011.01) |
| *H04N 21/658* | (2011.01) |
| *H04N 21/2343* | (2011.01) |

(52) U.S. Cl.
CPC ............ *H04L 65/604* (2013.01); *G06F 16/70* (2019.01); *G06F 16/9577* (2019.01); *G06F 16/986* (2019.01); *H04N 21/235* (2013.01); *H04N 21/23439* (2013.01); *H04N 21/431* (2013.01); *H04N 21/435* (2013.01); *H04N 21/4431* (2013.01); *H04N 21/6581* (2013.01); *H04N 21/84* (2013.01); *H04N 21/8402* (2013.01)

(58) Field of Classification Search
CPC ...................... H04N 21/4621; G06F 17/30905
See application file for complete search history.

(56) References Cited

U.S. PATENT DOCUMENTS

| | | | |
|---|---|---|---|
| 6,134,243 | A | 10/2000 | Jones et al. |
| 6,222,549 | B1 | 4/2001 | Hoddie |
| 6,353,929 | B1 | 3/2002 | Houston |
| 6,829,368 | B2 | 12/2004 | Meyer et al. |
| 7,827,312 | B2 | 11/2010 | Ramaswamy et al. |

(Continued)

FOREIGN PATENT DOCUMENTS

WO    WO 2012/001606 A1    1/2012

OTHER PUBLICATIONS

Anonymous. HTML Timed Media Elements, Mar. 19, 2007, pp. 1-16, retrieved from the Internet at: http://webkit.org/specs/HTML_Timed_Media_Elements.html.

(Continued)

*Primary Examiner* — Nathan Hillery
(74) *Attorney, Agent, or Firm* — BakerHostetler

(57) ABSTRACT

A method and apparatus for presenting timed media represented by data in a markup language (e.g., HTML) including examining a tag or metadata which is capable of specifying more than one form or representation of timed media, such as different versions of a video encoded according to different video codec standards.

37 Claims, 5 Drawing Sheets

Nested Tag or Metadata
300

(56) References Cited

U.S. PATENT DOCUMENTS

| | | | |
|---|---|---|---|
| 7,996,427 B1* | 8/2011 | Flick | G06F 17/30997 707/792 |
| 2001/0002900 A1* | 6/2001 | Romrell | H04L 67/06 370/216 |
| 2002/0007418 A1* | 1/2002 | Hegde | H04L 29/06027 709/231 |
| 2002/0138495 A1* | 9/2002 | Chang et al. | 707/102 |
| 2003/0112258 A1* | 6/2003 | Dietz | G06F 3/0481 715/700 |
| 2004/0133845 A1 | 7/2004 | Forstall et al. | |
| 2005/0216443 A1* | 9/2005 | Morton et al. | 707/3 |
| 2005/0262520 A1* | 11/2005 | Burnett et al. | 719/320 |
| 2006/0047779 A1 | 3/2006 | Deshpande | |
| 2006/0184871 A1* | 8/2006 | Waters | 715/512 |
| 2007/0022215 A1* | 1/2007 | Singer | G06F 17/3028 709/246 |
| 2007/0112837 A1* | 5/2007 | Houh et al. | 707/102 |
| 2007/0136782 A1 | 6/2007 | Ramaswamy et al. | |
| 2007/0192203 A1* | 8/2007 | Di Stefano | G06Q 30/02 705/26.8 |
| 2007/0192818 A1* | 8/2007 | Bourges-Sevenier | H04L 12/2803 725/132 |
| 2008/0120546 A1* | 5/2008 | Pulier | G11B 27/034 715/716 |
| 2008/0134012 A1* | 6/2008 | Kokes | G06F 17/30017 715/201 |
| 2011/0274179 A1 | 11/2011 | Holden | |
| 2014/0029916 A1* | 1/2014 | Dhawan | H04N 9/87 386/248 |

OTHER PUBLICATIONS

Anonymous. "Objects, Images, and Applets," *HTML 4.01 Specification, W3C Recommendation*, Dec. 24, 1999, pp. 1-21, retrieved from the Internet at: http://web.archive.org/web/20030210154019/http://www.w3.org/TR/REC-html40/struct/objects/html.

Gellens, R. et al. "The Codecs Parameter for 'Bucket' Media Types," *Request for Comments 4281, Category: Standards Track*, Internet Engineering Task Force (ITEF), Nov. 1, 2005, pp. 1-12.

Niererst, J. "Chapter 27: Introduction to SML," *Web Design in a Nutshell: A Desktop Quick Reference, Second Edition*, Sep. 2001, pp. 450-458.

PCT International Search Report and Written Opinion for PCT International Appln No. PCT/US2008/002697, dated Jul. 8, 2008 (15 pages).

Anonymous, "HTML Timed Media Elements", Mar. 21, 2007, pp. 1-16, retrieved from the Internet at: http://webkit.org/specs/HTML_Timed_Media_Elements.html.

* cited by examiner

PRESENTATION OF MEDIA IN AN APPLICATION

This application claims the benefit of U.S. Provisional Application No. 60/919,164, filed Mar. 20, 2007 by Eric Carlson, and this provisional application is incorporated herein by reference.

BACKGROUND OF THE INVENTION

Multimedia content over the Internet has become more popular as data connection speeds across networks have increased. While the World Wide Web has already been enriched by a variety of video and audio media, support for the timed media in user agents such as Web browsers is currently provided by a variety of implementations with their own peculiar sets of interfaces and behaviors. Many Web browsers, such as Internet Explorer, Firefox or Safari, and etc. use a helper program known as a "plug-in" to render and/or present video and/or audio (or other timed media) as media content. These helper or plug-in programs are not native code of the Web browsers and, when they run, they are software processes which are external and separate from the software processes of the Web browser. Timed media includes video, audio or other data which is presented, usually in some sequence, based on time. In other words, the presentation may be controlled by time, such as elapsed time from the beginning of the presentation, and hence, at any given time during the presentation, the content which is present depends upon that given time.

A user or a system being operated by the user may select a command in a Web browser to cause playback or presentation of the media content, and, in response, the Web browser determines an appropriate plug-in (typically a plug-in which is registered with the Web browser to handle the particular media content). In prior art systems, this is accomplished by embedding tags or metadata in the markup code (HTML) associated with the timed media content to specify the type of media and list the types of plug-ins operable to present the media. In HTML Web pages written for Internet Explorer, the Web page itself may specify the particular plug-in to use. For example, the HTML of the Web page may specify that a Windows Media Player plug-in is to be used to present media content (e.g. a short movie or other video and audio content). In web browsers other than Internet Explorer, it is up to the Web browser to find a registered plug-in for use based on the media type (e.g., mp4, etc.) specified in the HTML.

In these examples, a Web browser must either determine whether there is an appropriate plug-in or must use a single specified plug-in which may not be available. If it is not available, the media content cannot be displayed or otherwise presented.

SUMMARY OF THE DESCRIPTION

An apparatus and machine implemented method for presenting timed media content in an application is disclosed including, in one embodiment, causing playback of the timed media in a Web browser or other user agent and retrieving a tag (or other metadata) associated with the selected timed media content from a server or other system or storage device. In this embodiment, the tag specifies more than one format of the timed media so that the Web browser or other user agent can determine at least one format which is supported by native code running on the Web browser or other user agent based on examining the tag. This embodiment may further include retrieving and playing the timed media in the supported format.

A method in one embodiment includes: receiving a command to cause playback, through a user agent, which may be a Web browser, of timed media content; receiving from a resource a tag associated with the timed media content, the tag specifying a plurality of formats of the timed media content; determining, based on examining the tag, whether at least one format of the plurality of formats of timed media content is supported by at least one of a native code running on the user agent and code (e.g. a plug-in) available for use with the user agent (this plug-in or helper code may be available as a stored version on a device running the user agent or it may be downloadable to the device for use with the user agent); receiving data associated with the timed media content in a supported format determined by the determining operation; and playing the timed media content in the supported format. The tag may be specified in a markup language used to specify a web page. Other methods are described, and machine readable storage media for causing these methods to be performed and systems for performing these methods are also described.

DESCRIPTION OF THE DRAWINGS

A better understanding of the present invention can be obtained from the following detailed description in conjunctions with the following drawings, in which.

DETAILED DESCRIPTION

Figure 1:
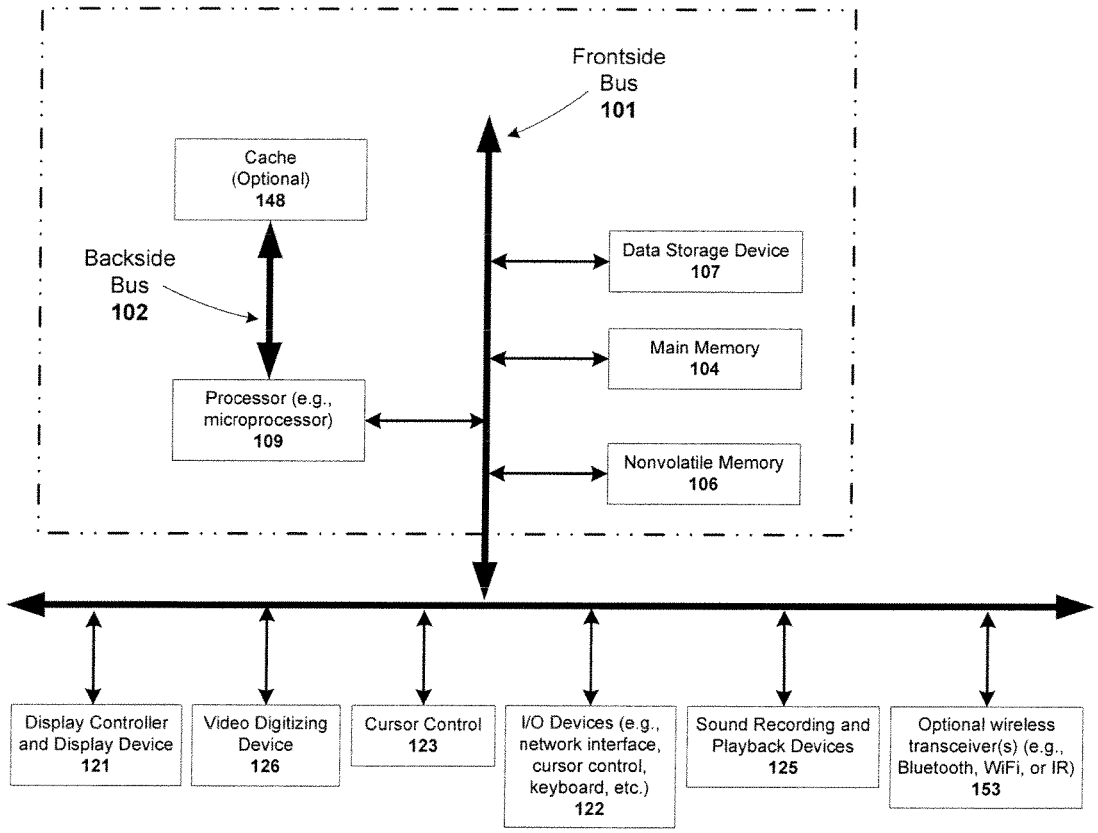
FIG. 1 illustrates an exemplary computer system upon which the methods and apparatuses of the present invention may be implemented.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or other electronic data processing device, that manipulates and transforms data represented as physical (electronic) quantities within the system's registers and memories into other data similarly represented as physical quantities within the system memories or registers or other such information storage, transmission or display devices.

The invention also relates to apparatuses for performing the operations described herein. This apparatus may be specially constructed for the required purposes, or it may comprise a general purpose computer or other data processing system selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions).

The algorithms and displays presented herein are not inherently related to any particular computer system or other apparatus. Various general purpose systems may be used with programs in accordance with the teachings herein, or it may prove convenient to construct more specialized apparatus to perform the required method's operations. The required structure for a variety of these systems will appear from the description below. In addition, the present invention is not described with reference to any particular programming language. It will be appreciated that a variety of programming languages may be used to implement the teachings of the invention as described herein.

A method and apparatus for presentation of media in an application is described. As discussed above, prior art systems often associate a helper or plug-in program for playback of multimedia content. Many times the plug-in is unavailable such as is typical for handheld data processing devices, such as PDAs or a wireless device (e.g. a cellular telephone). In some these cases, it is desirable to use a Web browser which cannot, or does not in its installed form, support a plug-in architecture for presenting media content. In those cases, a Web browser may have its own native code which can present certain media content (e.g. some form of timed media) but cannot present other media content because it does not include native code which can present the other media content. Accordingly, what is needed is a method for Web browsers or other user agents that do not support plug-ins to be supplied with a number of options as to the video and/or audio format with which to playback the multimedia content. In the present invention, this is accomplished by examining a tag or metadata associated with the media which specifies more than one format or representation for playback (such as different versions of a video encoded according to different video codec standards) so that a format supported by the native code running on the Web browser or other code available to the Web browser can be located and utilized.

In at least certain embodiments of the invention, a method for rendering or presenting content represented by data in a markup language (e.g. HTML) includes examining a tag or metadata which is capable of specifying, through the markup language, more than one form or representation of timed media, such as different versions of a video encoded according to different video codec standards. A Web browser or other user agent may, by examining this tag or metadata, determine whether it has native code (or, in certain embodiments, external code such as plug-ins which are available to the Web browser or other user agent) which can support at least one form or representation of the timed media. By specifying more than form or representation, the tag or metadata provides, in effect, fallback (or alternate) positions for presenting the timed media in those cases wherein the user agent does not support one or more preferred forms or representations of the content.

In at least certain embodiments, the user agent (e.g. a Web browser executing on a cellular telephone which includes a personal digital assistant or a handheld computer) may not support or use plug-ins for presenting at least certain timed media, and in this case, the user agent may use native code of the user agent to present the timed media. In this case, the user agent may examine the tag or metadata and attempt to find a native software element which is part of the user agent that can support at least one form or representation of the timed content. The tag or metadata may be in the form of a nested tag which specifies, in a nested format, more than one form or representation of the timed media content. The preferred from or representation may be specified first and examined first and if the user agent is not able to support the preferred form, then the user agent may examine the rest of the tag or metadata to determine what other forms or representations it can support. The other forms or representations may be characterized as fallback positions or forms. In addition, the tag or metadata may specify other parameters or conditions, such as bandwidth or data rates, which can be used to select which form of the content to present.

At least certain embodiments may not rely on plug-ins or helper applications to present the timed media. In these embodiments, code (e.g. software elements) which is native to the user agent is used to support the presentation, if possible, of the timed media. The code may be considered native if it is not part of a plug-in or helper application and if it, when it runs, is not an external process relative to the processes of the user agent.

At least certain embodiments of the invention may be a format of a markup language (e.g. HTML) or a cascading style sheet (CSS) and may be instantiated as a web page which provides alternative (e.g. fallback) forms of the timed media. This web page may be stored, in some form, by a web server or other resource and may be transmitted by the web server to a client system, such as a computer system (e.g. a handheld computer system or a PDA). As discussed above, the client system may take a variety of different forms (e.g. desktop computer, laptop computer, handheld computer, cellular telephone, cellular telephone with handheld computer capabilities, consumer entertainment system, or other consumer electronic devices) and may be coupled to a remote server or to a local storage device which can act as a server. Examples of client and server systems and networks to connect them are described in U.S. Pat. Nos. 6,222,549 and 6,134,243, and an example of a web browser is described in U.S. published Application No. 2004/0133845, and these patents and the application are hereby incorporated herein by reference.

Referring to FIG. 1 which illustrates an exemplary computer system 100 upon which embodiments of the present invention can be implemented. Computer system 100 comprises front-side bus 101 and back-side bus 102 (or other communications hardware and software for communicating information) coupled to processor 109 for processing information. Front-side bus 101 is a data path which runs between the CPU and main memory (RAM). Front-side bus 101 also couples data storage device 107, main memory 104, and non-volatile memory 106 to processor 109. Additionally, front-side bus 101 connects to an external bus coupling the processor to display controller and device 121, video digitizing device 126, cursor control device 123, input-output (I/O) devices 122, sound recording and playback devices 125, and optional wireless transceivers 153. Additionally, cache 148 is coupled to processor 109 via back-side bus 102. A back-side bus, such as, back-side bus 102, is the data path and physical interface between the processor and the L1 and/or L2 cache memory (not shown).

Computer system 100 further comprises a random access memory (RAM) or other dynamic storage device (referred to as main memory 104) coupled to bus 101 for storage information and instructions to be executed by processor 109. Main memory 104 also may be used for storing temporary variables or other intermediate information during execution of instructions by processor 109. Computer system 100 also comprises a read only memory (ROM) 106, and/or static storage devices coupled to bus 101 for storing static information and instructions for processor 109. Data storage device 107 is coupled to bus 101 for storing information and instructions.

Furthermore, data storage device 101 may include a magnetic disk or optical disk and its corresponding disk drive, which can be coupled to computer system 100. Computer system 100 can also be coupled, via bus 101, to display device 121 for displaying information to a computer user. Display device 121 typically includes a frame buffer, specialized graphics rendering devices, and a cathode ray tube (CRT) and/or a flat panel display. I/O device 122 including alpha numeric and other keys, is typically coupled to bus 101 for communication information and commands to processor 109. Another type of user input device is cursor control 123, such as a mouse, trackball, pin, touch screen, or cursor direction keys for communication direction information and command selections to processor 109 and for controlling cursor movement on display device 121. This input device typically has two degrees of freedom into axis, a first axis (e.g., x) and a second axis (e.g., y), which allows the device to specify positions in a plane. However, this invention should not be limited to input devices with only two degrees of freedom.

Another device that may be coupled to bus 101 is a device for sound recording and/or playback 125, such as an audio digitizer coupled to a microphone for recording information. Further, the device may include a speaker which is coupled to a digital-to-analog (D/A) converter for playing back the digitized sounds.

Also computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images and transmitted from others on the computer network.

Figure 2:
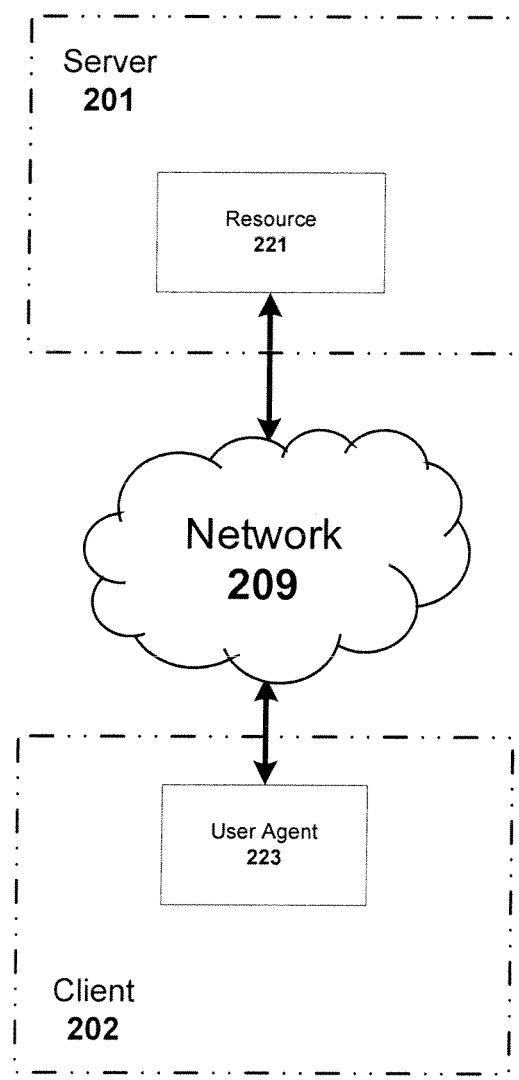
FIG. 2 illustrates a system according to one embodiment of the invention including a network coupling an exemplary user agent to a server.

Referring now to FIG. 2, which illustrates a system according to one embodiment of the invention including a network coupling an exemplary user agent to a server. Server 201 may be any data processing system such as a computer system, such as computer system 100 discussed above. Similarly, client 202 may be any computer or data processing system such as computer system 100 discussed above. Server 201 is coupled to client 202 over network 209. In one embodiment, network 209 may employ the Ethernet standard. However, embodiments of the present invention are not so limited. Examples of other types of broadcast media include, but are not limited to, fiber distributed data interface (FDDI) and token ring. In one embodiment, network 209 transmits data traffic among the different network elements employing the synchronous optical network (SONET) standard or synchronous digital hierarchy (SDH). However, embodiments of the present invention are not so limited, as data traffic among different network elements, such as server 201 and client 202 can be transferred using other types of transmission standards. Examples of other types of transmission standards can include, but are not limited to, T1, T3, data signal 3 (DS3) and DS1 signals. Server 201 includes resource 221 which, in one embodiment, is a timed multimedia content stored in a memory (not shown) of server 201 or stored in a storage device accessible to the server 201. Client 202 includes user agent 223 which, in one embodiment, is a web browser, such as Internet Explorer, Firefox, or Safari. For example, user agent 223 may be a web browser which may execute on a cellular telephone which includes a personal digital assistant or a handheld computer. User agent 223, in one embodiment, provides a user (through client 202) with a user interface (not shown) for accessing the Internet services and resources available through the World Wide Web. A web browser, such as user agent 223, is an application that provides a way to look at and interact with all the information on the World Wide Web. Technically a web browser uses hypertext transfer protocol (HTTP) to make requests of web servers throughout the Internet on behalf of the web browser user. HTTP is the actual communication protocol that enables web browsing. When web browsers, such as user agent 223, talk to web servers, such as server 201, they speak a language known as HTTP, which is essentially a set of rules for transferring files (text, graphic images, sound, video, and other multimedia files) over the World Wide Web. Hypertext markup language (HTML) is the language used in web browsing programs. HTML is often used for creating web pages.

A web browser, such as user agent 223, is software that interprets the markup of files in HTML or other markup languages, formats them into web pages, and displays them to the user. In operation, user agent 223 accesses resource 221 on server 201 over network 209, using HTTP. Multimedia content, therefore, is transferred between server 201 and user agent 223 using HTTP. Additionally, user agent 223 reads the data included within the multimedia content from resource 221 and reads the HTML and creates web pages at a user interface (not shown) of user agent 223 for users to interact with the resources available on server 201 over network 209.

Figure 3:
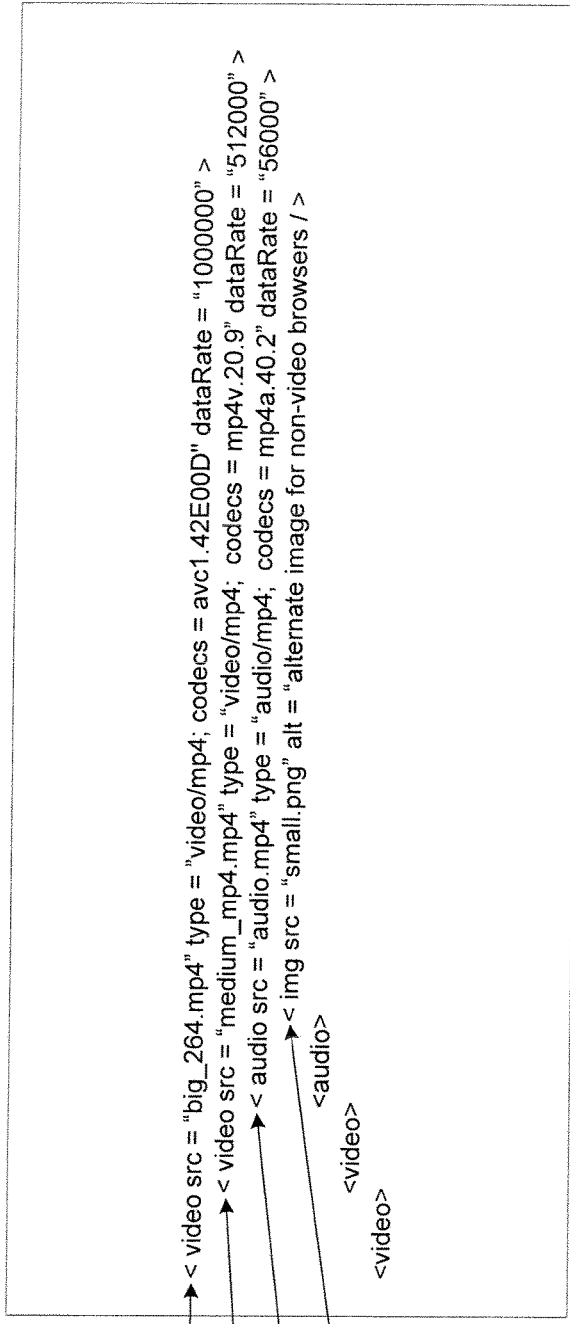
FIG. 3 illustrates an exemplary embodiment of a tag or metadata for use in a markup language according to one embodiment of the invention.

An example of a tag or a metadata for use in a markup language, such as HTML, or a cascading style sheet (CSS) is shown in FIG. 3. Referring to FIG. 3, which illustrates an exemplary embodiment of a tag or metadata for use in a markup language, according to one embodiment of the invention. In FIG. 3, outermost loop 301 refers to H.264 video specified in the tag by video src="big_264.mp4". This format requires, as specified by the tag, a data rate (e.g., minimum connection data rate) of at least 1 Mbps. Inner loop 303, specifies the alternate or fallback video format, in this case the video format is "MPEG-4 visual simple profile level 0" specified in the tag by video SRC="medium mp4.mp4". This format requires, as specified by the tag, a data rate of at least 512 kbps. Likewise a second alternative format contained within the second inner loop 305 refers to mp4 audio format specified by the tag as audio src="audio.mp4," and finally inner loop 307 refers to PNG image format specified as "img src="small.png." Hence, in this example, the tags specifies a preferred visual format of the media content (H.264) and an alternate (or fallback) video format of the media content (MPEG-4 visual simple profile level 0) (first fallback), an audio format (audio.mp4) (second fallback), and also a non-video visual format of the media content (PNG) (third and last fallback). It will be appreciated that other video and audio formats may also, in certain embodiments, be specified in a tag, such as tag 300 in this example.

In this example, a user agent, such as a web browser, can examine this tag or metadata, which may be in a web page retrieved from a web server or other server, and determine whether the user agent has its own native code (or a plug-in in certain embodiments) which can present the timed media in at least one of the formats or representations specified in the tag or metadata. In this example, the user agent may first determine if it can present the timed media. The user agent performs this by first examining an outermost loop of the nested tag configuration, such as outermost loop 301 shown in FIG. 3. In this example, outermost loop 301 is specified in H.264 video format. A movie having both audio and video components and capable of supporting H.264 video format would then be played using this format. The outermost loop in this embodiment is referred to as the "preferred format." That is, if the web browser has its own native code (or other code, such as a plug-in, which is available to the Web browser) to support H.264 (e.g., render and display), then the user agent can stop examining the tag for other video forms and retrieve the content in that form (assuming that the connection used by the web browser, e.g., a WIFI connection to the Internet that can support the data rate=1,000,000). If the user agent can support this preferred video format (for example, because the user agent includes its own native code to render and display this other video format) and the network connection data rate is at least 1 Mbps, then the user can cause the retrieval of the media content in this video format. This retrieval may be a download of a media content (which is saved at the system running the user agent) or a streaming media of the content (wherein the content is received and presented but not stored after being initially presented). If, on the other hand, the web browser does not have its own native code to support the H.264 format, then the user agent examines the next portion of the tag for another video form to determine whether it can support the other video form. As indicated in FIG. 3, the next portion of the tag would be mp4 format contained in inner loop 303. Again, if the user agent can support this alternate video format and the network connection data rate is at least 512 kbps, then the user agent can cause the retrieval of the content in this alternate video format. If the user agent cannot support the alternate video format, in this example, then the user agent can cause the playback of the audio only format as specified in inner loop 305. If the user agent cannot support the audio format as specified in inner loop 305, then the user agent may display an image as specified in inner loop 307 of the tag (image source=".png"). This process is illustrated in FIG. 4.

Figure 4:
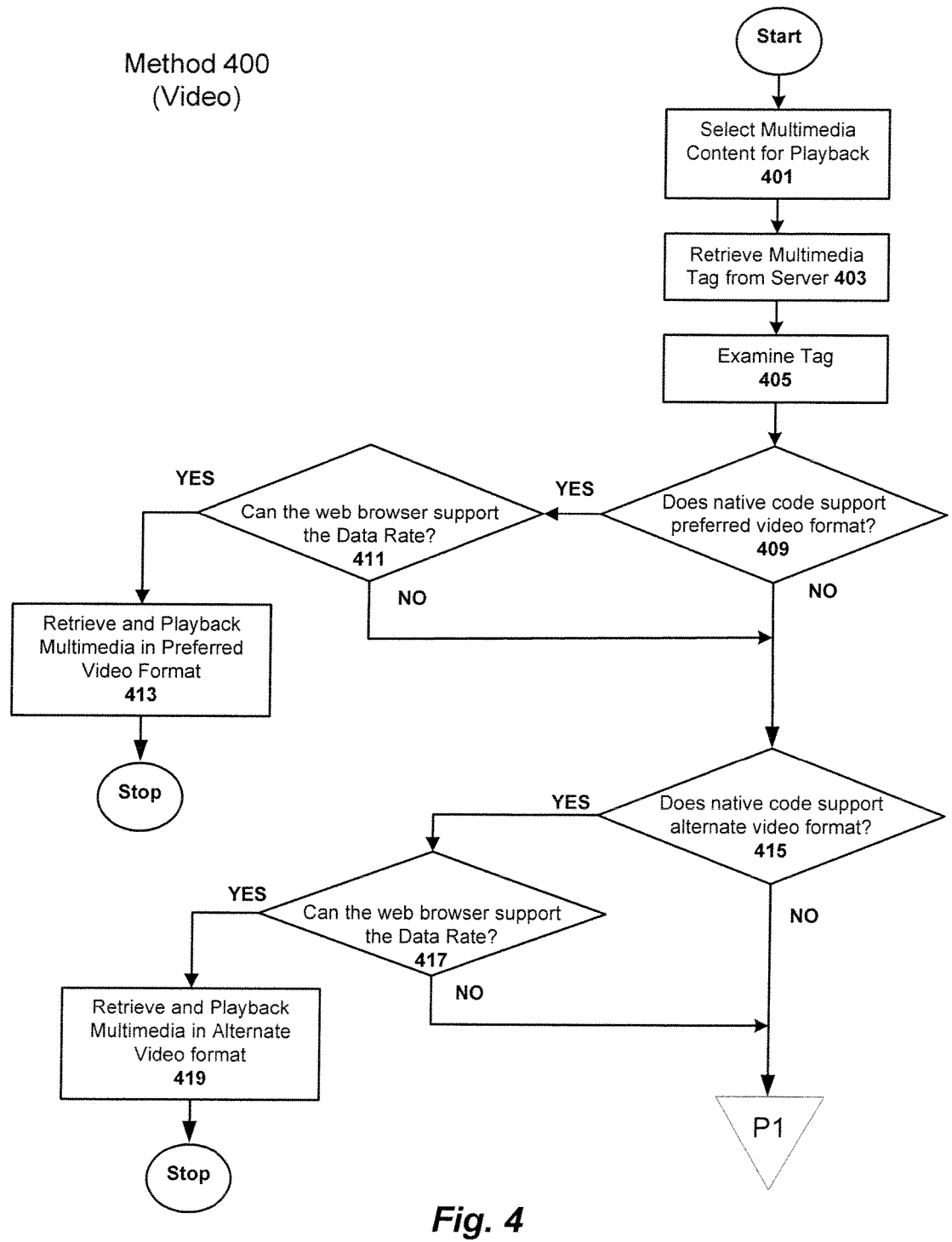
FIG. 4 illustrates a method of presenting media in an application supporting one or more video formats according to one embodiment of the invention.

FIG. 4 illustrates a method of presenting media in an application supporting one or more video formats according to one embodiment of the invention. In FIG. 4, method 400 starts, in operation 401, by receiving a selection of a multimedia content for playback. The user agent, such as a web browser, in one embodiment, receives a selection of a command within the web browser to cause playback of the timed media content. At operation 403, a tag is retrieved from a server containing the timed media content. The tag is associated with the selected media content and specifies more than one multimedia format. Additionally, the tag, in one embodiment, includes a nested configuration with a preferred format specified within an outermost loop of the nested tag and at least one alternate format specified with the inner loops so that each of the formats is examined in an order a decreasing preference. That is, the tag or metadata 300 is configured in a nested configuration written in HTML code so that as the code is examined it will be rolled out in such a way that the outermost loop with the preferred multimedia format is examined first and each of the successive alternate formats is iteratively examined after the preferred format is examined, and in an order of decreasing preference. At operation 405, the retrieved tag, which was retrieved from the server, is examined. In operation 409, it is determined whether the native code on the web browser can support the preferred video format. Referring back to FIG. 3, it is noted that the outermost loop 301 includes video src="big_264.mp4" type="video/mp4: CODECS=avc1.42E00D" data rate="1,000,000". As discussed above, the web browser will first determine based on the tag whether it can present the timed media content in the preferred format. If so, the web browser must also determine whether it can support the data rate. In operation 411, the tag is examined to determine whether the data rate is supported by the web browser. If, in operation 413, the web browser can support the data rate indicated in the outer loop of the nested tag data structure, the data associated with the selected timed media content in the supported format is retrieved from the server and is played back in the preferred video format. If, after examining the tag, it is determined in operation 409 that the web browser native code does not support the preferred video format, control flows to operation 415. In operation 415, it is determined whether the web browser native code can support an alternate video format specified in the nested tag. If so, control flows to operation 417, where it is determined whether the web browser can support the data rate indicated by the nested tag. If so, in operation 419, the data associated with the selected timed media content is retrieved from the server and played back in the supported format. The supportive format, in this case, is the alternate video format. Since the alternate video format was supported in operation 419, there is no need to send an error message from the web browser. If the data rate is not supported at operation 417 or if the web browser's native code does not support the alternate video format at operation 415, control flows to FIG. 5.

Figure 5:
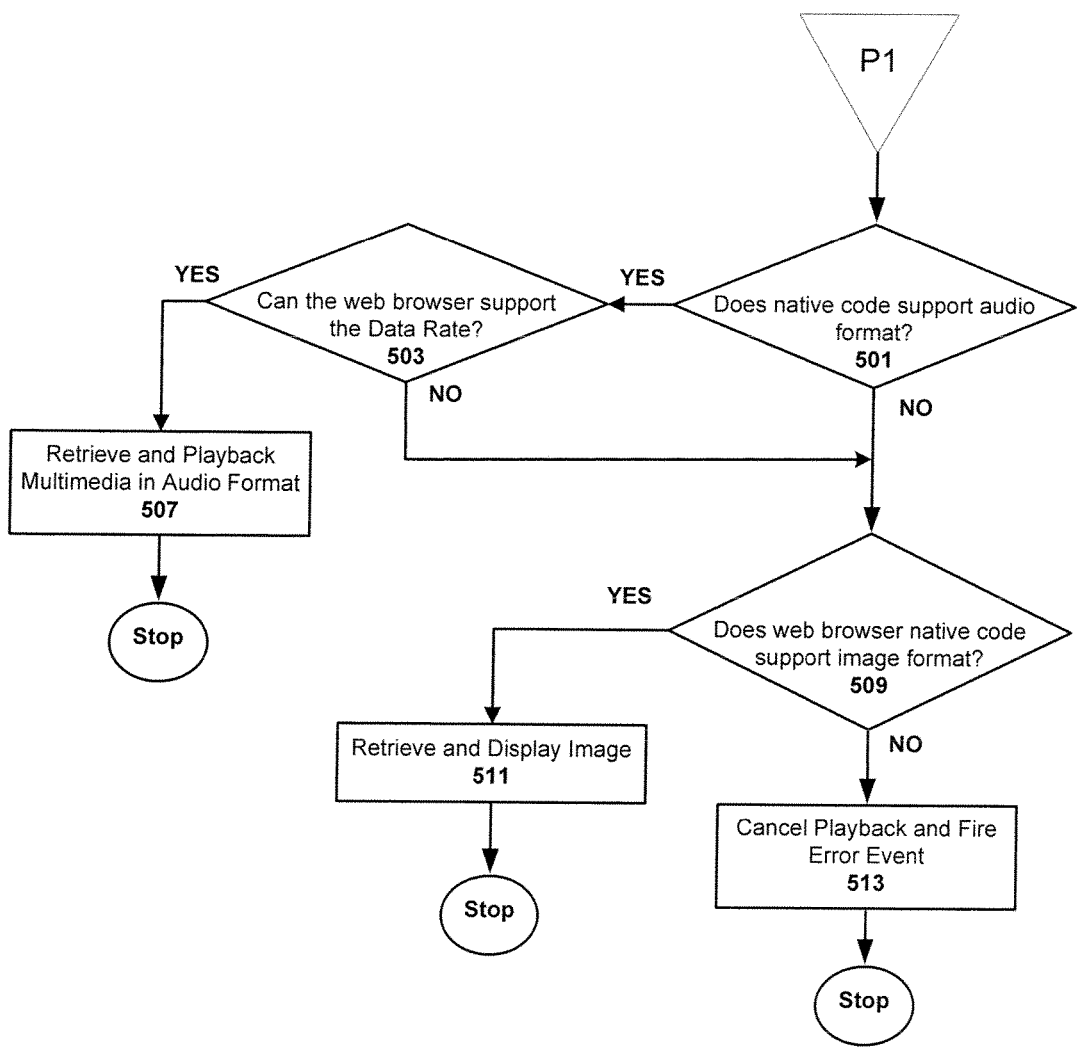
FIG. 5 illustrates an exemplary method of presenting media in an application supporting only non-video formats according to one embodiment of the invention.

FIG. 5 illustrates an exemplary method of presenting media in an application supporting only non-video formats according to one embodiment of the invention. In method 500 of FIG. 5, it is first determined at operation 501 whether the web browser's native code supports an audio format. If so, once again, the web browser must determine if the data rate can be supported at operation 503. If the data rate can be supported, then at operation 507, the data associated with the selected timed media content is retrieved from the server and played back in the supported format. If the data rate cannot be supported or if the web browser at operation 503 or if the web browser's native code does not support the audio format at operation 501, then it must be determined whether the native code of the web browser can support an image format at operation 509. If so, the image is retrieved from the server and displayed in the format supported by the web browser. If not, at operation 513 playback is cancelled and an error event is fired (e.g. an error message is sent by the web browser).

As discussed above, when the source attribute is set and the specified resource has a supported type, the user agent should prepare to present it according to the appropriate transfer protocol. This may entail the initiation of network sessions, including but not limited to file transfers. If the presentation of the timed media by the user agent has been disabled (if the resource has an unsupported type) or if the preparations for its presentation fails either because a protocol failure or because a format of the media is unrecognized, the user agent (web browser) should present the fallback content specified by the tag, if available. Additionally, the web browser may choose to proceed with a presentation of media that it can render only partially, for any of the following reasons: a media type is not supported, i.e. the resource contains one or more renderable substreams of types not supported by the user agent (example: a 3GGP file with timed text on a device that does not have a text renderer); a media format is not supported, i.e., a renderable substream of a type that is supported by the user agent contains media that cannot be decoded (example: a user agent that supports only H.264 video format at base-line profile encounters a MPEG-4 with a video track with H.264 frames encoded in the main profile); and/or the media cannot be rendered under the current constraints, i.e., there is no problem with the media types or formats, but the resource cannot be rendered anyway possibility temporarily (example, a user agent can decode only one H.264 video stream at a time is requested to decode multi streams simultaneously). From the user's perceptive, these cases look very much the same because their only obvious symptom is that some or all the media cannot be rendered. In this case, the user agent may omit a media render error.

The type attribute of the nested tag, if present, gives the MIME type of the media resource specified by src. This attribute is optional, but recommended as it allows the user agent to avoid loading information for unsupported content types. The values should be a valid MIME type (RFC 2046), optionally with parameters indicating codec(s) required to render the content (RFC 4281). The type attribute is purely advisory and is only intended for static fallback, and is only considered when deciding whether or not to initiate a load.

The user agent such as a web browser, would choose the outermost video type if it supports H.264 visual simple profile level 1, else the inner video type is chosen if the web browser supports MPEG-4 visual simple profile level 0, else the audio type is chosen if the web browser supports MPEG-4 audio, else the image type is chosen if the web browser supports PNG, else the alternate text is chosen. This format allows a markup language to specify how a multimedia content, such as timed media (e.g., video and/or audio) can be natively presented by the user without requiring the use of an external process (e.g., plug-in), and this format identifies through the specification in the markup language, alternative software elements which are native to the user agent and which could present the multimedia content (or alternate multimedia content) if the user cannot support a preferred content. In the example above, the preferred content is H.264 video; if the user agent does not include software elements or other processing elements (e.g. hardware processor) to process this type of content, then it can attempt to process and present alternate content through the use of alternate solution elements designed to decode and present MPEG-4 content (through the use of software elements, natively part of the user agent, or other processing elements (e.g. hardware processor) such as codec(s) specified "MP4v.20.9"). In addition, the format may also specify different control at different data rates (e.g., based upon the type of connection to a source of contents such as a type of connection to the Internet). In effect, the alternate contents and/or alternate software elements, provide fallback positions for the user agent to present the multimedia content in those situations where a preferred content is not supported (e.g., no native support) by the user agent.

The data rate, if present, specifies the minimum network connections speed (in bits per second) required to use the media resource. The mechanism used to measure bandwidth is determined by the user; some implementations may wish to use a static setting controlled by the user, and some may wish to use the average network throughput to the server hosting the media resource. The data rate attribute is purely advisory and is intended for static fallback. It is only considered when deciding whether or not to initiate a load. This is optional but recommended as it allows a content author to more precisely specify the resources required to render a media resource. Because the supportability and desirability of media container formats and media encoding formats vary according the needs and constraints of user agents, the process of static fallback for the HTML timed media elements allows the user agent to examine multiple descriptive attributes that indicate the suitability of a given resource for loading a presentation. Other advisory attributes are possible in order to describe content even more precisely, as suggested in part by CSS media queries.

Embodiments of the invention may include various operations as set forth above. The operations may be embodied in machine-executable instructions, stored on a machine readable storage medium, which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow.

What is claimed is:

1. A machine implemented method for presenting media in an application comprising:
   receiving a web page including a tag associated with a media item of the web page, the tag identifying different coded variants of the media item that are available by codec type;
   comparing the codec types identified by the tag to decoder types included in native code of the application;
   responsive to a match identified between a codec type identified by the tag and a decoder type in the native code, retrieving the coded variant of the media item corresponding to the matching codec type;
   decoding the coded variant of the media item by the matching decoder in the native code of the application;
   presenting the media item by the application.

2. The method of claim 1, wherein the application is a web browser, and the tag is specified in a markup language.

3. The method of claim 1, wherein an error event indicating a render error of the media item occurs when the native code of the application supports none of the plurality of codec protocols.

4. The method of claim 1, wherein the tag includes a MIME type specifying a codec required to present the media item.

5. The method of claim 1, wherein the tag further specifies a minimum data rate requirement associated with each of the plurality of codec protocols, and wherein the selected codec protocol is selected based in part on its associated minimum data rate.

6. The method of claim 1, wherein the media item in the supported codec protocol is retrieved from the resource over a network connection.

7. The method of claim 1, wherein:
   the web page is received from a network resource over a network connection; and
   the media item is retrieved the network resource over the network connection.

8. The method of claim 1, wherein:
   the tag identifies a plurality of codec types for video, and when the comparing step identifies no match between the video codec types identified by the tag to decoder types included in native code of the application, a still image representation of the media item is retrieved and rendered by the application.

9. The method of claim 1, wherein the media item is stored on a system executing the application and the media item is retrieved and presented incrementally over time.

10. The method of claim 1, wherein the media item is streaming media, is loaded and presented over time, and is not stored after it is presented.

11. The method of claim 1, wherein:
   the codec types identified by the tag are specified in a hierarchical configuration, and
   the comparing proceeds in order through the hierarchical configuration.

12. The method of claim 1, wherein the tag specifies the plurality of codec protocols in a nested configuration with a preferred codec protocol specified within an outermost loop and at least one alternate codec protocol specified within at least one inner loop.

13. The method of claim 12, wherein comparing comprises:
   iteratively comparing each of the inner loops of the nested configuration of the tag to decoder types included in native code of the application in order.

14. The method of claim 1, wherein the tag identifies at least one coded variant by a video codec protocol and at least one other coded variant by an audio codec protocol.

15. The method of claim 14, wherein the variant corresponding to the video codec protocol, when it generates a match, is prioritized over the variant corresponding to the audio codec protocol.

16. A non-transitory machine-readable storage medium that stores instructions which, when executed by a machine, cause the machine to perform a method of presenting media item in an application, the method comprising:
   receiving a web page including a tag associated with a media item of the web page, the tag identifying different coded variants of the media item that are available by codec type;
   comparing the codec types identified by the tag to decoder types included in native code of the application;
   responsive to a match identified between a codec type identified by the tag and a decoder type in the native code, retrieving the coded variant of the media item corresponding to the matching codec type;
   decoding the coded variant of the media item by the matching decoder in the native code of the application;
   presenting the media item by the application.

17. The non-transitory machine-readable storage medium of claim 16, wherein the application is a web browser, and the tag is specified in a markup language.

18. The non-transitory machine-readable storage medium of claim 16, wherein an error event indicating a render error of the media item occurs when the native code of the application supports none of the plurality of codec protocols.

19. The non-transitory machine-readable storage medium of claim 16, wherein the tag includes a MIME type specifying a codec required to present the media item.

20. The non-transitory machine-readable storage medium of claim 16, wherein the tag further specifies a minimum data rate requirement associated with each of the plurality of codec protocols, and wherein the selected codec protocol is selected based in part on its associated minimum data rate.

21. The non-transitory machine-readable storage medium of claim 16, wherein the media item in the supported codec protocol is retrieved from the resource over a network connection.

22. The non-transitory machine-readable storage medium of claim 16, wherein:
   the web page is received from a network resource over a network connection; and
   the media item is retrieved the network resource over the network connection.

23. The non-transitory machine-readable storage medium of claim 16, wherein:
   the tag identifies a plurality of codec types for video, and when the comparing step identifies no match between the video codec types identified by the tag to decoder types included in native code of the application, a still image representation of the media item is retrieved and rendered by the application.

24. The non-transitory machine-readable storage medium of claim 16, wherein the media item is stored on a system executing the application and the media item is retrieved and presented incrementally over time.

25. The non-transitory machine-readable storage medium of claim 16, wherein the media item is streaming media, is loaded and presented over time, and is not stored after it is presented.

26. The non-transitory machine-readable storage medium of claim 16, wherein:
   the codec types identified by the tag are specified in a hierarchical configuration, and
   the comparing proceeds in order through the hierarchical configuration.

27. The non-transitory machine-readable storage medium of claim 16, wherein the plurality of codec protocols in the tag are specified in a nested configuration with a preferred codec protocol specified within an outermost loop and at least one alternate codec protocol specified within at least one inner loop.

28. The non-transitory machine-readable storage medium of claim 27, wherein comparing comprises:
   iteratively comparing each of the inner loops of the nested configuration of the tag to decoder types included in native code of the application in order.

29. The non-transitory machine-readable storage medium of claim 16, wherein the tag identifies at least one coded variant by a video codec protocol and at least one other coded variant by an audio codec protocol.

30. The method of claim 29, wherein the variant corresponding to the video codec protocol, when it generates a match, is prioritized over the variant corresponding to the audio codec protocol.

31. A machine implemented method for presenting media item, the method comprising:
   receiving, from a user agent, a request for web page containing a piece of media item;
   transmitting, to the user agent, the web page including a tag specifying a plurality of codec protocols available for a piece of media item; and
   wherein the plurality of codec protocols in the tag are specified in a nested configuration with a preferred codec protocol specified within an outermost loop and at least one alternate codec protocol specified within at least one inner loop such that the nesting indicates an order of preference where inner loops indicate a decrease in preference over outer loops.

32. The method of claim 31, wherein the transmitting is performed through a TCP/IP network and the media item is to be rendered by the user agent.

33. A non-transitory machine-readable storage medium that stores instructions which, when executed by a machine, cause the machine to perform a method of presenting media item in an application, the method comprising:
   receiving, from a user agent, a request for web page containing a piece of media item;
   transmitting, to the user agent, the web page including a tag specifying a plurality of codec protocols available for a piece of media item; and
   wherein the plurality of codec protocols in the tag are specified in a nested configuration with a preferred codec protocol specified within an outermost loop and at least one alternate codec protocol specified within at least one inner loop such that the nesting indicates an order of preference where inner loops indicate a decrease in preference over outer loops.

34. The method of claim 33, wherein the transmitting is performed through a TCP/IP network and the media item is to be rendered by the user agent.

35. A machine implemented method for presenting media in a media player comprising:
   receiving a web page including a tag associated with a media item of the web page, the tag identifying different coded variants of the media item that are available by codec type;
   comparing the codec types identified by the tag to decoder types included in native code of the media player;
   responsive to a match identified between a codec type identified by the tag and a decoder type in the native code, retrieving the coded variant of the media item corresponding to the matching codec type;
   decoding the coded variant of the media item by the matching decoder in the native code of the media player;
   presenting the media item by the media player.

36. A non-transitory machine-readable storage medium that stores instructions which, when executed by a machine, cause the machine to perform a method of presenting media item in a media player, the method comprising:
   receiving a web page including a tag associated with a media item of the web page, the tag identifying different coded variants of the media item that are available by codec type;
   comparing the codec types identified by the tag to decoder types included in native code of the media player;
   responsive to a match identified between a codec type identified by the tag and a decoder type in the native code, retrieving the coded variant of the media item corresponding to the matching codec type;
   decoding the coded variant of the media item by the matching decoder in the native code of the media player;
   presenting the media item by the media player.

37. A system comprising a processor and a memory, the memory including instructions for a media player, that when executed by the processor, cause:
   receiving a web page including a tag associated with a media item of the web page, the tag identifying different coded variants of the media item that are available by codec type;
   comparing the codec types identified by the tag to decoder types included in native code of the media player;
   responsive to a match identified between a codec type identified by the tag and a decoder type in the native code, retrieving the coded variant of the media item corresponding to the matching codec type;
   decoding the coded variant of the media item by the matching decoder in the native code of the media player;
   presenting the media item by the media player.

* * * * *